(12) United States Patent
Swanson

(10) Patent No.: US 7,949,116 B2
(45) Date of Patent: May 24, 2011

(54) PRIMARY DATA STREAM COMMUNICATION

(75) Inventor: Jon N. Swanson, Queensbury, NY (US)

(73) Assignee: Insors Integrated Communications, Chicago, IL (US)

( * ) Notice: Subject to any disclaimer, the term of this patent is extended or adjusted under 35 U.S.C. 154(b) by 1859 days.

(21) Appl. No.: 10/730,510

(22) Filed: Dec. 8, 2003

(65) Prior Publication Data

US 2004/0249967 A1 Dec. 9, 2004

Related U.S. Application Data

(60) Provisional application No. 60/472,648, filed on May 22, 2003.

(51) Int. Cl.
*H04M 3/42* (2006.01)

(52) U.S. Cl. ............... 379/202.01; 379/93.21; 379/158; 370/260; 455/416

(58) Field of Classification Search .......... 379/202.01–206.01, 93.21, 158; 704/275; 715/716, 753; 348/14.09; 370/260–269; 455/416; 709/204

See application file for complete search history.

(56) References Cited

U.S. PATENT DOCUMENTS

| | | | |
|---|---|---|---|
| 5,506,954 A | 4/1996 | Arshi et al. | |
| 5,758,079 A | 5/1998 | Ludwig et al. | |
| 5,838,914 A | 11/1998 | Carleton et al. | |
| 5,867,156 A | 2/1999 | Beard et al. | |
| 5,870,547 A | 2/1999 | Pommier et al. | |
| 5,872,923 A | 2/1999 | Schwartz et al. | |
| 5,874,960 A | 2/1999 | Mairs et al. | |
| 5,889,946 A | 3/1999 | FitzPatrick et al. | |
| 5,896,128 A * | 4/1999 | Boyer | 715/716 |
| 5,915,908 A | 6/1999 | Beutler | |
| 5,923,844 A | 7/1999 | Pommier et al. | |
| 5,938,724 A * | 8/1999 | Pommier et al. | 709/205 |
| 5,944,785 A | 8/1999 | Pommier et al. | |
| 5,948,022 A | 9/1999 | Carleton et al. | |
| 5,948,056 A | 9/1999 | Mizuno et al. | |
| 5,949,975 A | 9/1999 | Batty et al. | |
| 5,995,096 A | 11/1999 | Kitahara et al. | |
| 6,025,871 A | 2/2000 | Kantor et al. | |
| 6,047,314 A | 4/2000 | Pommier et al. | |
| 6,075,571 A | 6/2000 | Kuthyar et al. | |
| 6,078,948 A | 6/2000 | Podgorny et al. | |
| 6,115,027 A | 9/2000 | Hao et al. | |
| 6,151,020 A | 11/2000 | Palmer et al. | |
| 6,201,859 B1 * | 3/2001 | Memhard et al. | 379/93.21 |
| 6,204,847 B1 | 3/2001 | Wright | |
| 6,216,177 B1 | 4/2001 | Mairs et al. | |
| 6,253,167 B1 | 6/2001 | Matsuda et al. | |
| 6,268,855 B1 | 7/2001 | Mairs et al. | |

(Continued)

OTHER PUBLICATIONS

Polycom, "Guide to Conferencing and Collaboration", (2003), p. 2-9.
Intercall, "MeetingCenter", www.intercall.com (believed published circa 2003).
Tanberg, Tanberg Scheduler: Videoconference Scheduling and Room Reservation, www.tanberg.net (Jul. 2002).
Latitude Communications Inc., "Meeting Place Web 4.0", www.meetingplace.net (2003).

(Continued)

*Primary Examiner* — Md S Elahee
(74) *Attorney, Agent, or Firm* — Greer, Burns & Crain, Ltd.

(57) ABSTRACT

A method for communicating one or more primary data streams between a plurality of attendees connected to a communications network includes steps of communicating a plurality of data streams from each of the attendees to all others of the attendees, and of designating at least one of the streams from one of the attendees as primary. The primary stream is identified using a primary selection command.

19 Claims, 3 Drawing Sheets

U.S. PATENT DOCUMENTS

| | | | |
|---|---|---|---|
| 6,271,839 B1 | 8/2001 | Mairs et al. | |
| 6,285,363 B1 | 9/2001 | Mairs et al. | |
| 6,292,166 B1 | 9/2001 | Palmer et al. | |
| 6,304,648 B1 * | 10/2001 | Chang | 379/202.01 |
| 6,329,984 B1 | 12/2001 | Boss et al. | |
| 6,421,047 B1 | 7/2002 | de Groot | |
| 6,442,758 B1 * | 8/2002 | Jang et al. | 725/119 |
| 6,584,493 B1 * | 6/2003 | Butler | 709/204 |
| 6,621,514 B1 * | 9/2003 | Hamilton | 348/14.09 |
| 6,677,979 B1 | 1/2004 | Westfield | 348/14.12 |
| 6,760,749 B1 | 7/2004 | Dunlap et al. | |
| 6,775,247 B1 * | 8/2004 | Shaffer et al. | 370/260 |
| 6,894,715 B2 * | 5/2005 | Henrikson | 348/14.07 |
| 6,963,910 B1 | 11/2005 | Belknap et al. | |
| 7,002,973 B2 * | 2/2006 | MeLampy et al. | 370/401 |
| 7,009,971 B2 | 3/2006 | Novaes | |
| 7,054,820 B2 * | 5/2006 | Potekhin et al. | 704/275 |
| 7,133,923 B2 * | 11/2006 | MeLampy et al. | 709/231 |
| 7,151,762 B1 | 12/2006 | Ho et al. | |
| 7,193,996 B2 | 3/2007 | Dobbins et al. | |
| 7,224,382 B2 | 5/2007 | Baker | |
| 7,225,459 B2 | 5/2007 | Magliaro | |
| 7,366,780 B2 | 4/2008 | Keller et al. | |
| 2001/0043571 A1 | 11/2001 | Jang et al. | |
| 2002/0133473 A1 | 9/2002 | Grande et al. | |
| 2004/0111472 A1 | 6/2004 | Swanson et al. | |
| 2004/0117446 A1 | 6/2004 | Swanson | |
| 2004/0236593 A1 | 11/2004 | Swanson | |

OTHER PUBLICATIONS

Jennifer Teig von Hoffman, "How to Start up an Access Grid Node Using Virtual Venues", (2001), p. 1-12.

Access Grid, "The Access Grid Project", www.accessgrid.org (believed published circa 2001).

Jennifer Teig von Hoffman, "Beginner's Guide to Facilitating Interactive Communications on the Access Grid," (2002), p. 1-18.

Jennifer Teig von Hoffman, "Guide to Distributed PowerPoint", (2001), p. 1-14.

RADVision, "IP Centric Conferencing", (2001) p. 1-14.

Wainhouse Research, "Will Your Next Video Bridge Be Software-Based?" Examining a Next-Generation Software-Based Video Conference Server, (2003) p. 1-10.

ClearOne, "A Guide to Multipoint Conferencing", (2002) p. 1-24.

Sonexis, "Evaluating Conferencing Solutions", A Buyer's Guide, p. 1-22.

Sprint, "How Businesses Can Get the Most Out of Conferencing and Collaboration Tools", (2002) p. 1-14.

Timothy M. O'Neil, Polycom, Inc., "Demystifying IP Migration for IT Professionals", (2003) p. 1-15.

Avaya, Inc. "Avaya Multipoint Conferencing Unit," Advanced Multipoint Conferencing for Collaborating in Powerful New Ways, 2002.

* cited by examiner

PRIMARY DATA STREAM COMMUNICATION

CROSS REFERENCE

The present application claims priority under 35 U.S.C. §119 on U.S. Provisional Application No. 60/472,648 filed on May 22, 2003.

FIELD OF THE INVENTION

The present invention is related to data communications, and to communication of a real-time data streams over a network as part of a virtual meeting.

BACKGROUND OF THE INVENTION

Many data applications involve communications of a plurality of data streams. Virtual meetings that include audio and video communications, by way of example, include communication of audio data streams, video data streams, and other data streams. Within this exemplary application, some conferences simultaneously link multiple attendee conference rooms that communicate data streams such as video, audio, applications, and the like. Each location may be communicating data streams from multiple cameras, microphones, and other sources to all of the other locations. The receiving location receives all of the streams from all of the other locations. In some virtual meetings the receiving attendee conference room may choose which received streams to display video and play audio from. Multiple streams may be displayed so that the receiving conference room can see and hear multiple of the other conference rooms.

When a large number of conference rooms are participating, and each generating a large number of data streams, the conference can become muddled and disorganized. For example, if ten attendees each have four cameras, then each attendee will receive thirty-six video streams. Displaying all of these streams, and further viewing them in a meaningful way, can be difficult and even impractical.

In a prior art meeting in one location with many attendees, one speaker at one location may moderate the meeting, and have other attendees request permission to speak. In this manner, only one speaker at a time presents, and all conference attendees can focus on that speaker. While this is known in prior art meetings and conferences where all attendees are present in a single location, coordinating this in a multi-conference room virtual meeting has proven difficult.

Unresolved problems in the art therefore remain.

SUMMARY OF THE INVENTION

The present invention is directed to methods for communicating at least one primary data stream. An exemplary method of the invention includes steps of communicating a plurality of real time data streams from each of a plurality of attendees connected to one another over a communications network to all others of the plurality of attendees, and communicating a primary selection command to at least a portion of the plurality of attendees. The primary selection command designates at least one of the plurality of real time data streams communicated from at least one of the plurality of attendees as a primary stream. The method further includes step of using the primary selection command to identify the primary data stream at the at least a portion of the plurality of attendees.

DETAILED DESCRIPTION

Embodiments of the present invention are directed to methods and computer program products for communicating at least one primary real time data stream between a plurality of attendees connected to one another by a communications network. Before describing an exemplary embodiment of the invention, it will be appreciated that program products of the invention may embody methods, and that methods of the invention may be practiced by a computer. A program product of the invention, for example, may be computer executable instructions stored on a computer readable memory that when executed cause one or more computers to perform steps of a method of the invention. Accordingly, it will be understood that description herein of a method embodiment of the invention may likewise apply to a computer program product, and likewise that description of a program product may apply to a method.

Exemplary methods and program products of the invention may find particular utility when practiced in association with a virtual meeting. As used herein, the term "virtual meeting" is intended to be broadly interpreted as an event in which real time communications occur between meeting attendees that are not physically present with one another. By way of particular example, a virtual meeting can be an audio/video conference conducted between attendees remote from one another over a digital data network. Also, as used herein the term "real-time" is intended to be broadly interpreted as meaning substantially instantaneous. For example, telephone communications over a PSTN may be considered to be "real-time" based on the consideration that when a telephone user speaks his voice data is received at a far end of the PSTN at substantially the same time it is transmitted (although some small delay occurs). Finally, the term "attendee" is intended to broadly refer to a participant in the virtual meeting. Exemplary attendees may be one or more individuals using a data communications device linked to the virtual meeting, or may represent the linked data communications device itself.

Figure 1:
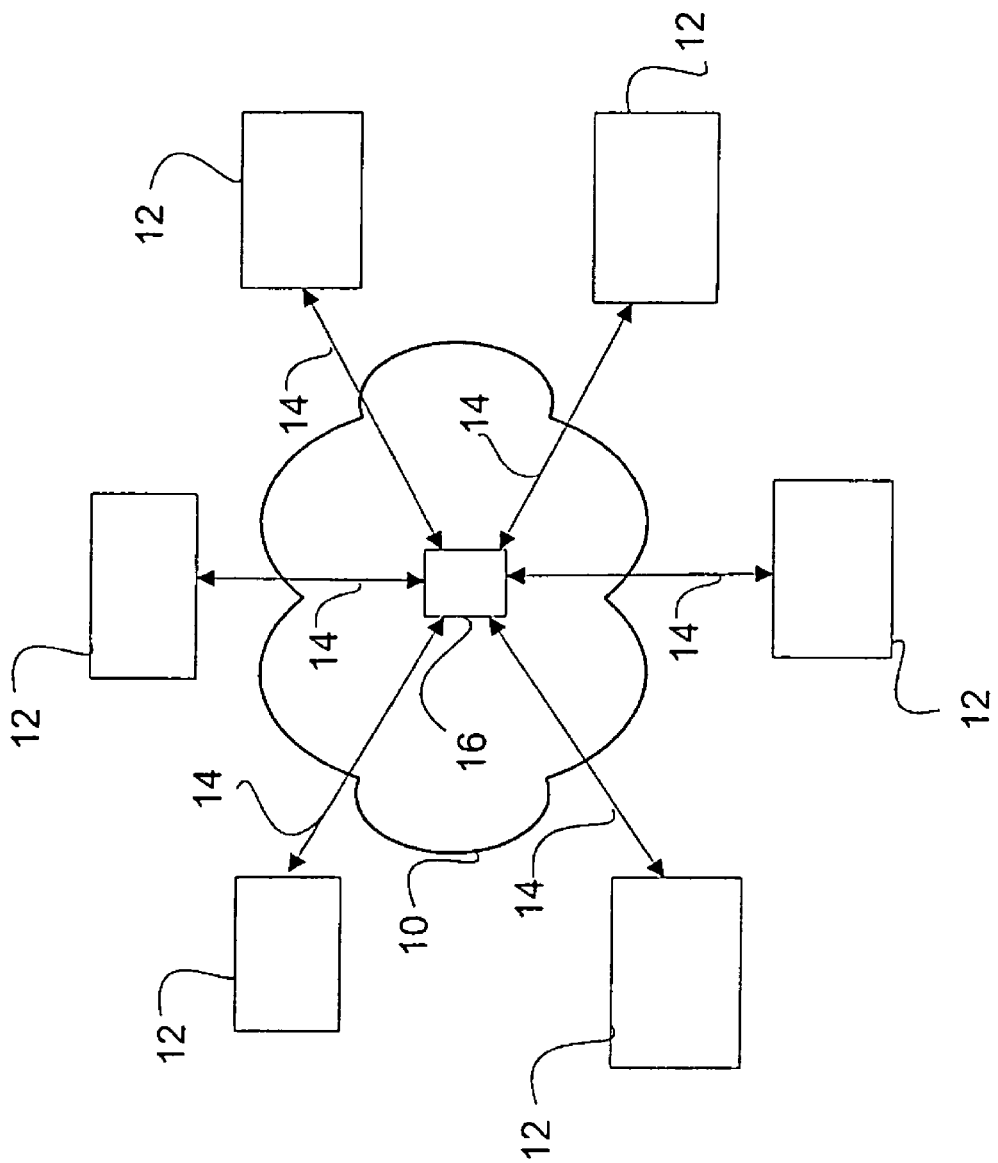
FIG. 1 is a schematic of a network useful to illustrate an exemplary method of the invention.

FIG. 1 is a schematic of a network 10 with a plurality of virtual meeting attendees 12 connected thereto. The network 10 may be any suitable interconnection for communicating data between the conference rooms 12, with examples including a digital data network, the PSTN, a wireless network, and the like. A preferred network 10 for practicing the invention includes a digital network configured for carrying packet-based data, such as an internet protocol network. These particular networks are believed to show great promise for carrying real-time video conferences with a high quality of service, at a reasonable cost, and in a highly immersive environment that is rich in data sharing.

Each of the attendees 12 are connected by a communications connection 14 to an interface 16 that is also connected to the network 10. The communications connection 14 may be a wire, a wireless connection, or other like linkage suitable for carrying communications such as packet-based digital data. The term "interface" as used herein is intended to be broadly interpreted as meaning a link useful to connect the different attendees. The interface 16 may be, for example, one or more of a bridge, a network card, a computer server or router, a software switch, a port, or the like. An exemplary interface 16 comprises a bridge having a plurality of ports.

In an exemplary method of the invention, the attendees 12 are conference rooms equipped to provide an electronic interface between individuals participating in the meeting and other individuals participating in the meeting that are not physically present in the same conference room. It will be appreciated that the attendees 12 may be embodied in many other forms in addition to the conference rooms 12. For example, other attendees may not be conference rooms at all, but may instead be individual attendees at individual computers, or may even be individuals using data sending and receiving devices other than computers. Example devices include mobile electronic devices such as phones, personal digital assistants, and the like. Accordingly, the term "attendee" as used herein is intended to be broadly interpreted as meaning a human and/or electronic participant in a virtual meeting.

Figure 2:
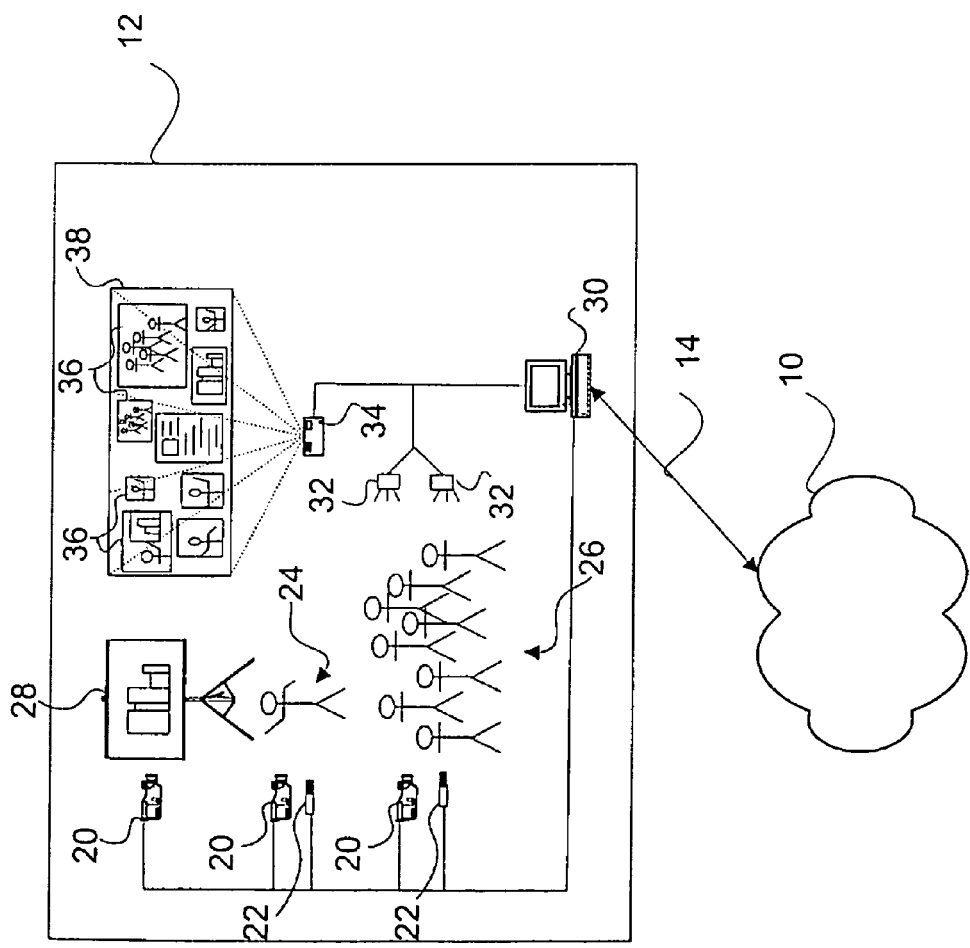
FIG. 2 is a schematic of a conference room 12 of FIG. 1.

FIG. 2 is a schematic illustration of one exemplary conference room 12. It generally includes a plurality of cameras 20 and a plurality of microphones 22. The cameras 20 and the microphones 22 may be trained on a speaker 24, an audience 26, a data presentation 28, and the like. The cameras 20 and microphones 22 are linked to a computer 30 which may include a coder module for encoding the signals of the cameras 20 and the microphones 22. The computer 30 is also useful for communicating the encoded real time data streams from the cameras 20 and microphones 22 to the network 10 over the linkage 14. Other real time data streams may also be communicated to the network 10 by the computer 30, such as pre-recorded events, shared documents, and the like.

The computer 30 also receives communications from the network 10 over the linkage 14. The received communications can include real time video and audio data streams from the other conference rooms 12, as well as other data such as application data, replayed video, graphics and the like. The computer 32 may include a decoder for decoding received signals. The audio streams may be played over speakers 32, and video streams sent to one or more projectors 34 for displaying images 36 from the other conference rooms 12 on a screen 38. The images 36 displayed on the screen 38 may include the speakers, audiences, documents, recorded video, and the like received from other of the conference rooms 12. An operator may select which images 36 to show, as well as select how to position and size them on the screen 38.

Depending on factors such as the number of conference rooms 12 participating in the virtual meeting, and the number of cameras 20 and microphones 22 at each, a large number of images 36 and audio streams may be present. For convenience the audio streams from all of the conference rooms 12 may be bundled into a single stream so that all speakers and audiences can be heard simultaneously over the speakers 32. In this manner, a rich and immersive virtual meeting may be conducted in which many participants may hear, see and interact with one another in real time despite the fact that they are not physically present with one another.

It will be appreciated that the configuration of conference room 12 as illustrated in FIG. 2 is exemplary only, and that many other configurations are possible. Those skilled in the art will appreciate that the particular configuration may be established as will be useful for a particular application. More or fewer cameras and microphones could be present, for example. Also, the projector 32 and screen 36 could be replaced by one or more monitors.

Through an embodiment of the present invention, a primary data stream may be designated from those being communicated. This may be useful to provide some structure and organization to a virtual meeting that might otherwise become disorganized or even chaotic. For example, one video data stream showing one particular speaker may be designated as "primary," with all other attendee conference rooms 12 then displaying that stream on their screens 38 in a highlighted manner. A particular position and size may be reserved, for instance, for the display 36 that has been designated as "primary." This allows for all of the many individuals attendant at each of the conference rooms 12 to experience the conference with a degree of consistency and focus.

Figure 3:
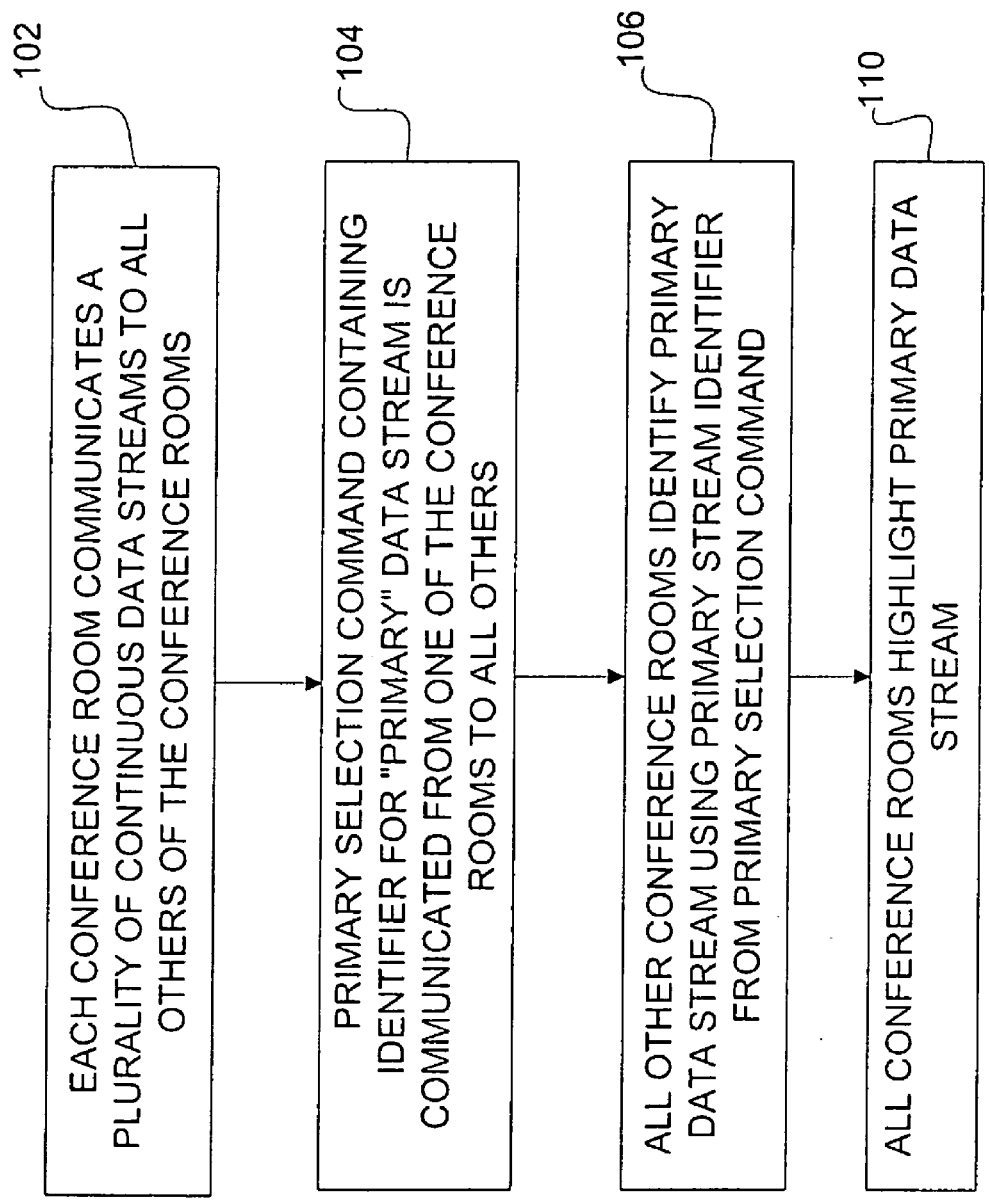
FIG. 3 is a flowchart illustrating one exemplary method of the invention; and,
FIG. 4 is an exemplary display template.

FIG. 3 is a flowchart of one exemplary method of the invention for communicating a primary data stream. Each of the conference rooms 12 communicate a plurality of real time data streams to all of the other conference rooms 12 across the network 10 (block 102). The plurality of real time data streams may include data streams from each of the cameras 20, microphones 22, replayed stored audio/video data, application data streams, and the like. Examples of real-time application data streams are a Word document, an Excel spreadsheet, a drawing, other application document that is being shared and collaborated on in real-time in a virtual meeting, real-time output from a modeling or other program, and the like. In cases of document-based data such as a spreadsheet, the document may be communicated continuously so that changes are seen in real-time by all attendees.

Each of the real time data streams communicated from each of the attendees preferably includes an identifier. The term "identifier" as used herein in this context is intended to be broadly interpreted as referring to a label, code, name, or other data that identifies a data stream. For example, an identifier may be header data communicated with packets of a packet based data stream that identifies the source and/or the content of the data stream (e.g., user 2332, camera 1).

A primary selection command is then communicated that identifies one or more of the plurality of data streams as the "primary" stream (block 104). The command preferably includes the identifier of the desired data stream(s). The primary selection command may be generated from one of the conference rooms 12, or from another source connected to the network 10. For example, a meeting facilitator may decide which stream to designate as primary. As used herein, the term "facilitator" is intended to be broadly interpreted as a person or computer program used to manage the virtual meeting, but not to participate in the meeting as an attendee. For example, a facilitator may be an individual using a computer connected to the network to view and listen to all of the streams being communicated between the attendees, but that does not communicate a video or audio stream to all of the attendees. The stream may be identified by such a facilitator, by an operator of the computer 30 at one of the conference rooms 12, or by another that uses a selector such as a keyboard or mouse controller to select one stream displayed on a screen, and entering a selection command such as a keystroke or button-click.

More than one stream can be designated primary, and more than one primary selection command can be communicated. For example, each conference room 12 may communicate a primary selection command that designates one of the streams being generated from it as primary. As a result, each conference room would be communicating one primary data stream, and all conference rooms 12 will receive one primary stream from each of the other rooms 12. By way of additional example, a second primary selection command from a second source may be used to change an existing primary stream designated by a first source. By way of still further example, a primary selection command might designate a plurality of streams in a priority ranking.

One or more rules may be enforced to control designation of primary streams. For example, a rule may be enforced that designates from where and when a primary stream selection command can be communicated. Only a facilitator, only a particular conference room, or similar source may be designated as the only sources from which commands can be issued. Or, a rule may call for a virtual control "token" to be passed, with the "token holder" the only attendee allowed to issue a primary selection command. The token might be passed by request, or according to a pre-set schedule that allowed all of the attendees, for instance, to hold the token for a 3 min. period. Other rules may designate how many streams can be designated as primary at a given time, which streams can be primary, and the like.

The primary selection command(s) when received by the conference rooms 12 is used to identify the primary stream (block 106). For example, the primary stream identifier may be extracted from the selection command and stored in a memory accessible to the computer 30. The computer 30 may then monitor incoming data stream traffic and compare the identifiers for all of the streams to the stored primary identifier until the primary stream is identified.

Figure 4:
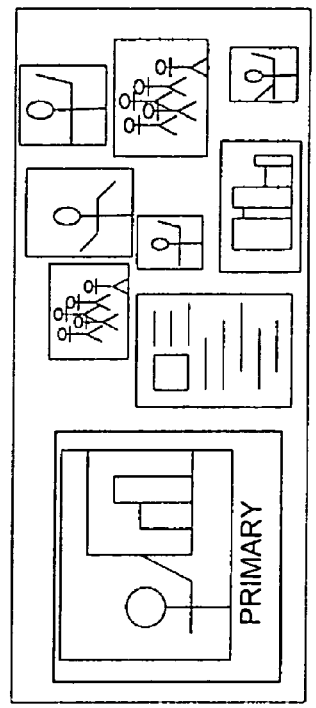

Once identified, the computer 30 outputs the primary data stream in a highlighted manner. The terms "highlights" and "highlighted" as used herein in this context are intended to broadly refer to treating with a higher priority than others. For example, the primary data stream may be a video data stream, in which case highlighting can include displaying in a larger display image 36 (FIG. 2) than other streams, in a designated "primary" display position on the screen 38 (FIG. 2), or using similar enhanced visuals. This highlighting helps to signify to viewers that the stream is the "primary" stream. FIG. 4 shows an exemplary display template that features the primary video data stream in a larger size than the other streams, in a designated placement upper left hand location, and with a "Primary" label.

Those skilled in the art will appreciate that the exemplary embodiments described and discussed herein are exemplary only, and that the invention is not limited to these embodiments. For example, although embodiments of the invention have been illustrated in the context of a virtual meeting, it may be practiced in other real-time data stream sharing environments as well. By way of additional example, although embodiments have been illustrated with particular numbers of meeting attendees and data streams, it will be appreciated that the method of the invention may be practiced on any practical scale. Invention methods and program products may be practiced, for example, with virtual meetings that include tens, hundreds, or more conference rooms and/or attendees, and with real time data streams that far outnumber the one illustrated herein.

Also, it will be appreciated that although exemplary method and program products have been illustrated in a particular sequence of steps, the sequence is not necessarily important to the invention and could easily be altered. Those skilled in the art will also appreciate that a computer program product of the invention may be practiced using one computer, or may be practiced using a plurality of computers that are connected by a data network, with some method steps performed by a first computer and other steps performed by a second, connected computer.

The invention claimed is:

1. A method for communicating a plurality of primary data streams between a plurality of attendees connected to one another by a communications network comprising the steps of:

communicating a plurality of real time video data streams from each of the plurality of attendees to all others of the plurality of attendees wherein each of the plurality of attendees receives said plurality of real time video data streams including at least one video data stream originating from each of the other attendees;

one of the plurality of attendees communicating a primary selection command that is received by at least a portion of the plurality of attendees and stored in a memory by each of said at least a portion of the plurality of attendees, said primary selection command designating a plurality of said plurality of real time video data streams communicated from at least one of the plurality of attendees as primary video data streams, said primary selection command including a priority ranking for each said primary video data stream; and, each of said at least a portion of the plurality of attendees using said primary selection command to identify at least one of said primary video data streams at said at least a portion of the plurality of attendees.

2. The method for communicating a plurality of primary data streams as defined by claim 1 wherein said plurality of primary data streams are video data streams, and further including the step of at least some of said attendees displaying at least one of said primary data streams in a highlighted manner.

3. The method for communicating primary data streams as defined by claim 2 wherein the step of displaying said primary data streams in a highlighted manner comprises displaying said primary streams in a larger display size than any others of said plurality of data streams.

4. The method for communicating primary data streams as defined by claim 2 wherein the step of displaying said primary data streams in a highlighted manner comprises displaying said primary streams using a display template.

5. The method for communicating primary data streams as defined by claim 4 wherein said screen display template includes a designated position for displaying said primary data streams.

6. The method for communicating primary data streams as defined by claim 1 wherein each of said plurality of real time data streams has an identifier, and wherein said primary selection command includes said identifier corresponding to said primary video data streams.

7. The method for communicating primary data streams as defined by claim 1 wherein each of said plurality of real-time data streams has a unique identifier, and wherein said primary selection command includes said unique identifier corresponding to said primary data streams, and wherein the step of each of the plurality of attendees using said primary selection command to recognize said primary streams further includes using said primary stream identifier.

8. The method for communicating primary data streams as defined by claim 1 wherein the plurality of real time data streams communicated from each of said plurality of attendees includes a plurality of real time video streams and at least one real time audio stream, and wherein said primary selection command designates at least one of said plurality of real time video streams from at least one of said plurality of attendees.

9. The method for communicating primary data streams as defined by claim 1 and further including the step of enforcing one or more rules that define where said primary selection command may be communicated from.

10. The method for communicating primary data streams as defined by claim 9 wherein said at least one rule calls for said primary selection command to be generated only from a designated one of said plurality of attendees, said at least one rule also allowing for said designated attendee to be changed to a different of said plurality of attendees.

11. The method for communicating at least one primary data streams as defined by claim 1 wherein said primary selection command is communicated from a meeting facilitator connected to the network, said meeting facilitator monitoring all of said plurality of data streams but not communicating a video or audio data stream to said plurality of attendees, and wherein said at least a portion of said plurality of attendees is all of said plurality of attendees.

12. The method for communicating primary data streams as defined by claim 1 wherein said primary selection command includes a first primary selection command, and wherein the method further includes the step of communicating a second primary selection command to at least a portion of said plurality of attendees, said second primary selection command causing said at least one primary stream to be replaced by at least one second primary stream identified in said second primary selection command.

13. The method for communicating primary data streams as defined by claim 12 wherein said second primary selection command is communicated from a second of said plurality of attendees to all others of said plurality of attendees.

14. The method for communicating primary data streams as defined by claim 1 wherein said plurality of attendees are a plurality of conference rooms participating in a virtual meeting, each of said conference rooms having a plurality of cameras that each generate a real time video signal and at least one microphone that generates a real time audio signal, and wherein said plurality of primary data stream includes at least one video data stream from each of said plurality of conference rooms wherein each conference room communicates at least one primary video stream and at least one other video stream to all others of the attendees.

15. The method as defined by claim 1 wherein the method further includes the steps of:
    enforcing a rule that allows only one of the plurality of attendees that is the holder of a virtual token to communicate said primary selection command; and
    said one of the plurality of attendees holding said virtual token passing said virtual token to a second of the plurality of attendees wherein said second of the plurality of attendees may communicate said primary selection command.

16. The method as defined by claim 1 wherein:
    each of said at least a portion of said attendees has a computer at their location for receiving said plurality of data streams from others of said attendees;
    wherein said memory in which said primary selection command is stored is in said computer at each of said at least a portion of said attendees; and,
    wherein the step of using the primary selection command to identify said primary stream comprises said computer receiving said plurality of data streams and comparing said streams to said primary selection command stored in said memory to identify said at least a primary data stream.

17. A method for communicating a plurality of primary data streams between a plurality of attendees participating in a virtual meeting over a data network comprising the steps of:
    carried out by a first of the plurality of attendees: communicating a plurality of real time data streams to all others of the plurality of attendees, said plurality of real time data streams including at least one video data stream and at least one audio data stream, selecting a plurality of said plurality of real time data video streams as a primary data stream, communicating a primary selection command identifying said primary data streams to all others of the plurality of attendees, said primary selection command including a priority ranking for each said primary video data stream; and,
    carried out by all others of the plurality of attendees: receiving said plurality of real time data streams communicated from the first of the attendees wherein each attendee receives a plurality of video data streams, receiving said primary selection command communicated from the first of the attendees, using said primary selection command to recognize said primary data streams, and displaying said primary data streams in a highlighted manner.

18. A computer readable memory storing a computer program product for communicating a plurality of primary data streams over a data network, the computer program comprising instructions when executed causing one or more computers to:
    communicate a first plurality of real time data streams to a plurality of attendees connected to the communications network, said first plurality of real time data streams including at least one video data stream and at least one audio data stream wherein each of the plurality of attendees receive said first plurality of real time data streams;
    each of a portion of the plurality of attendees using a primary selection command to identify a plurality of said plurality of real time video data streams as primary data streams, said primary selection command including a priority ranking for each said primary video data stream;
    communicate a first primary stream identification to said plurality of attendees, said first primary stream identification command identifying a plurality of said first plurality of real time data streams as first primary data streams;
    receive a second plurality of real time data streams from said plurality of attendees, said second plurality of real time data streams including at least one video data stream and at least one audio data stream;
    receive a second primary stream identification command from at least one of said plurality of attendees;
    use said second primary stream identification command to identify at least one second primary video data stream from said second plurality of real time data streams, and communicate said second primary stream identification to said plurality of attendees wherein each of said plurality of attendees receives said first primary stream identification and said second primary stream identification and uses said first and second primary stream identifications to identify said first and second primary video streams, said plurality of users thereby receiving two different primary video data streams.

19. The computer readable memory as defined by claim 18 wherein the computer program instructions further cause the one or more computers to display said second primary stream in a highlighted manner.

* * * * *